United States Patent [19]

Deschamps

[11] 3,973,718

[45] Aug. 10, 1976

[54] METHOD OF MANUFACTURING A HEAT EXCHANGER CORE

[75] Inventor: Nicholas H. Deschamps, Whippany, N.J.

[73] Assignee: Deschamps Laboratories, Inc., East Hanover, N.J.

[22] Filed: Oct. 18, 1974

[21] Appl. No.: 516,021

Related U.S. Application Data

[63] Continuation-in-part of Ser. No. 367,317, June 6, 1973, abandoned.

[52] U.S. Cl. .......................... 228/183; 29/157.3 R; 228/217; 228/248
[51] Int. Cl.² ..................... B23K 1/04; B23K 35/02
[58] Field of Search ............... 29/157.3 R, 419, 494, 29/500, 501, 504, 163.5 R, 163.5 F; 228/183, 217, 221, 248

[56] References Cited
UNITED STATES PATENTS

| | | | |
|---|---|---|---|
| 2,645,006 | 7/1953 | Hadley | 29/500 |
| 2,723,449 | 11/1955 | Miller | 29/494 |
| 2,877,903 | 3/1959 | Veres | 29/163.5 F |
| 2,985,411 | 5/1961 | Madden | 29/155.3 R |
| 3,656,226 | 4/1972 | Burne | 228/248 X |
| 3,673,678 | 7/1972 | Moreau et al. | 29/494 |
| 3,762,026 | 10/1973 | Shapiro | 29/419 X |
| 3,885,529 | 5/1975 | Renzi | 165/165 X |

Primary Examiner—James L. Jones, Jr.
Assistant Examiner—K. J. Ramsey
Attorney, Agent, or Firm—Martin G. Raskin

[57] ABSTRACT

A heat exchanger core includes a communicating set of metallic tubular elements, preferably aluminum, for carrying a primary fluid and a matrix of rounded metallic elements. The matrix elements are metallurgically bonded to one another and to the tubular elements. This arrangement of the matrix creates a multiplicity of communicating interstices which serve as passageways for the secondary fluid. The surface of the rounded elements constitutes the major area exposed to the secondary fluid flow. The rounded elements are metallurgically bonded by preferably a brazing technique. Relatively small particles of low melting temperature alloy, preferably aluminum, are dispersed throughout a stacked arrangement of relatively larger rounded elements, preferably of aluminum of a higher melting temperature. In one brazing method, an assembly of tubes, large rounded elements and smaller particles are brazed in a vacuum brazing oven. At the temperature of the oven, the smaller particles melt but the larger elements do not. Still another material, previously added, also melts and reacts with any oxide film present on the larger elements allowing the welded aluminum to fuse to these elements and to the tubes.

9 Claims, 12 Drawing Figures

METHOD OF MANUFACTURING A HEAT EXCHANGER CORE

This application is a continuation-in-part of application Ser. No. 367,317 filed June 6, 1973 now abandoned.

FIELD OF THE INVENTION

This invention relates to heat exchangers and, more particularly, to a heat exchanger core having a finless construction.

BACKGROUND OF THE INVENTION

Heat exchanger cores in common use today generally employ a set of tubes to carry the primary circulating fluid and a plurality of parallel fins or plates which fit over the tubes. This construction requires rather expensive tooling to make the fins, which have a large number of precisely located holes corresponding to the location of the tubes. The assembly of such units is not readily adapted to automated techniques so that substantial and costly manual assembly must take place. The present invention substantially reduces manufacturing costs and assembly time by completely eliminating the use of fins.

A separate consideration in the construction of heat exchangers is their ability to withstand extreme environmental conditions such as vibration, thermal cycling and pressure gradients. It is also toward meeting this combination of requirements which the present invention is directed.

Conventional heat exchanger cores are usually used in conjunction with some means for propelling the secondary fluid through the core. Typically the secondary fluid is air and the means for moving the air is a fan or blower. This movement causes heat to be transferred between the air and the heat exchanger core. Such fans or blowers must rotate at high speeds to cause the air to flow through the restricted flow paths of the heat exchanger. The result of these high rotational speeds is that substantial noise emanates from the fans. The present invention allows a favorable construction of the exchanger core to enclose the fan thereby reducing the noise considerably. This construction is effected without sacrificing thermal performance.

Another major difficulty with conventional heat exchangers is their inherently large volume. This is particularly so because of the necessary physical separation between the air mover (fan or blower) and the fin and tube core. The present invention, on the other hand, permits complete flexibility of configuration which can result in complete integration of the core and blower to maximize the use of available volume.

SUMMARY OF THE INVENTION

Accordingly, it is an object of the present invention to provide a heat exchanger requiring substantially reduced production tooling for manufacture and essentially eliminating manual assembly.

It is another object of the present invention to provide a heat exchanger core which is extremely strong and rugged and capable of withstanding the rigors of extreme environmental conditions such as thermal cycling, vibration and pressure gradients.

It is a further object of the present invention to provide a finless heat exchanger and thereby eliminating all of the problems associated with fins, e.g. fin bending, fin assembly time, etc.

It is a still further object of the present invention to provide a heat exchanger which can easily conform to most any geometric configuration, without substantial cost penalties or manufacturing complications.

It is still another object of the present invention to provide a heat exchanger core which produces a minimum of noise as the secondary fluid is caused to flow over the core.

It is an additional object of the present invention to reduce the power required to force a flow of secondary fluid through the heat exchanger core.

It is yet another object of the present invention to provide a heat exchanger core that has a minimum number of metallurgically or mechanically bonded joints in the primary fluid circuit.

It is a still additional object of the present invention to provide a heat exchanger core adapted to completely surround and encompass the fan or blower to substantially reduce the noise emanating from the fan and the heat exchanger.

It is yet a further object of the present invention to provide a heat exchanger core adapted to be so integrally combined with the blower as to substantially reduce the volume of the heat exchanger assembly.

Other objects and features of the present invention will become apparent by reference to the following description and drawings while the scope of the invention will be pointed out in the appended claims.

In accordance with present invention a heat exchanger core comprises metallic tubular means for transporting a primary fluid, the tubular means having an inlet port and an outlet port adapted to transfer a primary fluid to the exchanger core and a matrix of rounded metallic elements metallurgically bonded to one another and to the tubular means, the matrix having communicating interstices for the passage of a secondary fluid through the exchanger core.

DESCRIPTION OF THE INVENTION

Figure 1:
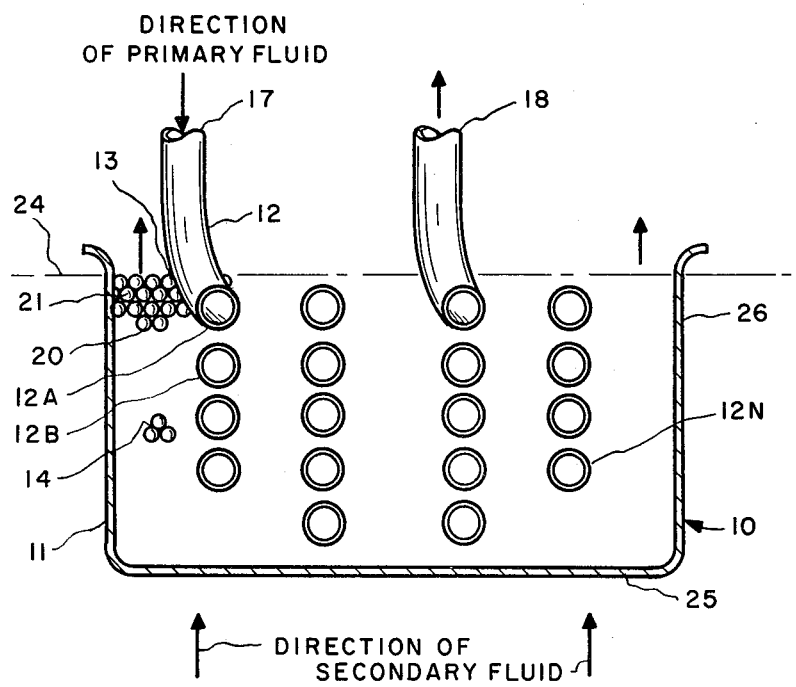
FIG. 1 is a side view partially in section of a heat exchanger core in accordance with the present invention.

Referring initially to FIG. 1, a heat exchanger core 10 is shown. As is known, the function of the heat exchanger is to transfer heat from one fluid to another. The exchanger core comprises metallic tubular means depicted as tube 12. Tube 12 is a continuous tube which, by virtue of u-shaped bends, forms a number of parallel tubular sections extending transverse to the core. These individual portions of the tube are shown in cross-section in FIG. 1 and are designated 12A–12N.

In a preferred arrangement, the tubular portions are spaced so that there will be approximately equal distance between center lines when looking at the sectional end view as shown in FIG. 1 (this section being through a plane drawn transversely to the longitudinal axis of the tubular portions). The tube 12 has an inlet port 17 and an outlet port 18 for the circulation of the primary fluid of the heat exchanger.

The exchanger core 10 also comprises a core matrix 11 having a multiplicity of rounded metallic elements 20 metallurgically bonded to one another and to the tubular means, tube 12. In a preferred form of the rounded elements 20, they are formed spherical in shape or balls and are packed or nested together in a manner to be described with respect to FIG. 6. Rounded elements 20 thus are tightly packed to touch each other and the tubular portions 12 A–N. In fact, the rounded elements are metallurgically bonded by small minisci at points of tangency between the balls 14 or between balls and the tubular portions 13. The arrangement of the balls and tube in the matrix creates communicating interstices for the passage of a secondary fluid through the exchanger core.

The heat exchanger core 10 is bounded by a metal screen 11 which serves as a container for the matrix and core during assembly and brazing operations. The screen 11 is preferably shaped as a right circular cylinder having a base 25 and side surface 26, the end opposite base 25 remaining open. It is also possible to outwardly slope side surface 26 away from base 25 to allow the stacking of screens 11 in a nested or "dixie cup" fashion prior to assembly.

Figures 6, 6A:
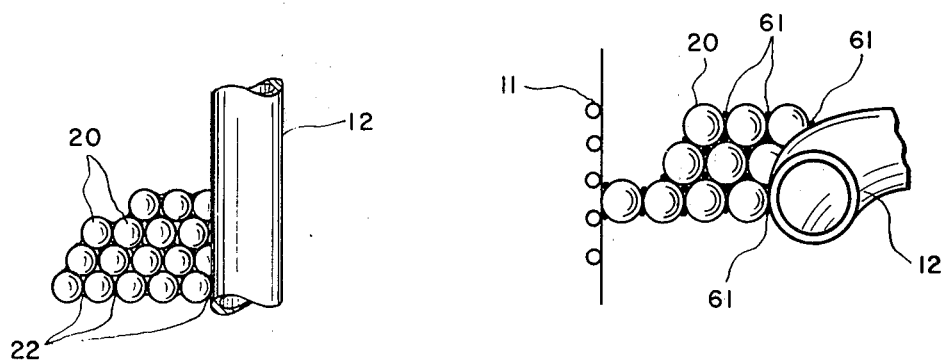
FIG. 6 is a view in section illustrating the metallurgical contact between the rounded elements and between rounded elements and tubes of a heat exchanger core in accordance with the present invention.
FIG. 6a is a view of balls, particles and tubes before brazing.

The tubular means 12 and spheres or balls 20 are preferably of an appropriate aluminum alloy. It is also possible to construct the exchanger using copper or other suitable metals. In fabricating the exchanger of FIG. 1, the tubular portions are originally formed relative to each other and to the screen 11 in accordance with known thermodynamic principles. The tubular portions must be firmly held relative to the center line of the tubular portions are usually symmetric about the center line) and relative to the screen 11 during assembly and brazing operations. Subsequent to this relative positioning, a mixture of preferably spherical aluminum balls 20 and smaller aluminum particles 61, as shown in more detail in FIG. 6a, are placed within or poured into the screen container 11 and allowed to "flow" around the tube 12 until the volume bounded by the base 25, side surface 26 and filling level 24 is filled to capacity. Like the spherical aluminum balls, the smaller aluminum particles are loosely introduced, each of the particles being discrete from the other. The openings of screen 11 must be sufficiently small to prevent the balls 20 from escaping.

The screen itself may be made from aluminum, steel (including stainless steel) or other suitable material of sufficiently high melting point.

The aluminum alloy of the smaller aluminum particles 61 melts at a temperature below that of spheres 20, typically about 70°F lower. In one example of the invention, the balls 20 were designed to melt at 1200°F and the particles 61 at 1120°F. One mixture of balls and particles, which is merely an example and is not intended to limit the invention, employed 5–10% by weight of the smaller particles of typically 0.01 inch diameter size and 90–95% by weight of the balls having a typical diameter of 0.125 inches.

The screen container 11 with the tube and mixture of balls and particles is then subject to a brazing process. A preferred brazing technique is a vacuum brazing process where the entire assembly is placed in a vacuum brazing oven. This type of brazing takes place in a vacuum or inert atmosphere and is a fluxless technique. Another feasible approach would be to place the assembly in a molten salt bath. The brazing step occurs at a temperature sufficient for the small particles to melt but not sufficient to melt the balls. The result is that the particles 61 form minisci which connect the balls to one another and to the tube 12. These minisci 22 are shown in more detail in FIG. 6. In that exploded view, the minisci can be seen between adjacent balls 20 and between the balls 20 and tube element 12.

Although the arrangement described immediately above has proven to be effective to an extent, it has been discovered that when aluminum alloys are utilized, oxide films present on the surfaces of the high temperature aluminum alloy balls prevent the most efficacious bond from being formed between the balls and the melted low temperature aluminum alloys, i.e., these oxide films are not sufficiently broken to allow the melted low temperature aluminum alloy to achieve the necessary intimate contact with the balls to bond well to them. Since aluminum is an exceptionally desirable material for heat exchangers due to its light weight and low cost (relative to other commonly used metals such as copper and brass), a solution to this problem has been sought.

It has been discovered that by adding small quantities of another material to the combination of balls and particles described above, the effect of the oxide films is obviated and an exceptionally strong bond between the melted low temperature aluminum alloy and high temperature aluminum alloy balls is achieved. More particularly, by adding relatively small quantities of magnesium to the arrangement illustrated in FIG. 6a, the oxide films present on the balls 20 are broken and dissipated resulting in a better bond being formed between the melted low temperature aluminum alloy and the high temperature aluminum alloy balls.

Figure 6B:
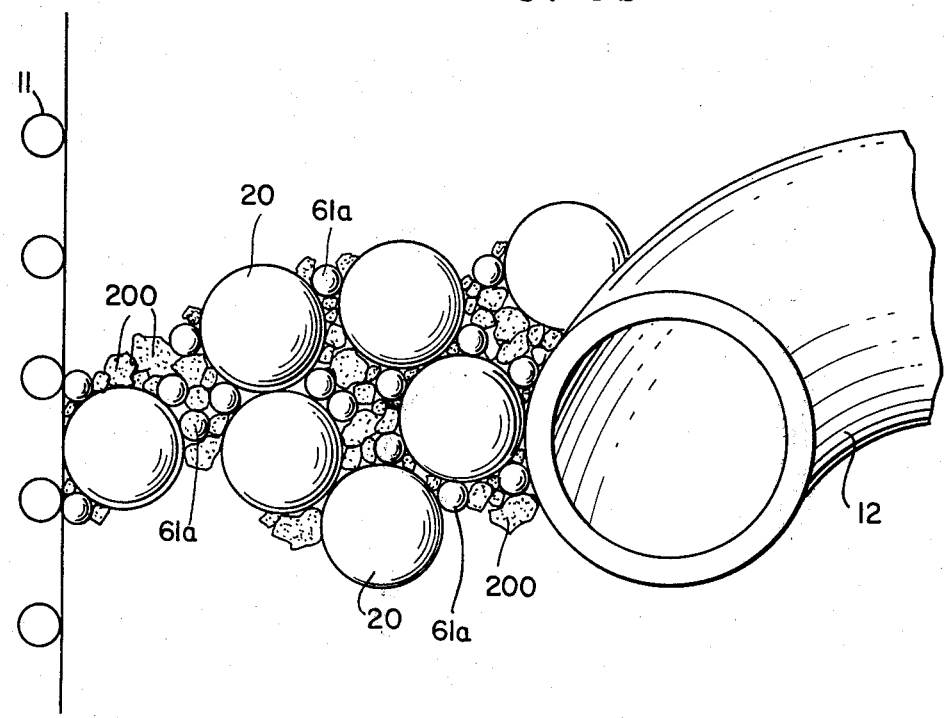
FIG. 6b is a view of spheres formed of high and low temperature alloy and another material which facilitates the brazing process.

Referring to FIG. 6b, an arrangement of low temperature aluminum alloy spheres 61a and magnesium powder 200 are illustrated interspersed between spheres 20 of high temperature aluminum alloy. The spheres 20 may be formed of any aluminum alloy having a higher melting point than the aluminum alloy material which forms spheres 61a. For example, spheres 20 are preferably about ⅛ inch diameter and may be formed of 1100, 3003, 5005 or 6951 aluminum alloy, which melts around 1160°F. Spheres 61a are preferably about 1/32 inch diameter and may be formed of 4000 series aluminum alloy (aluminum-silicon alloy) which melts around 1080°F whereas the magnesium powder may comprise particles ranging in size between 1/32 and 1/16 inch. It is understood however, that it is only necessary to have aluminum alloy of relatively low melting point and magnesium interspersed among the higher temperature aluminum alloy spheres and that other materials than those used in the illustration may be employed. Preferably, the spheres 20 comprise about 90% of the total weight of the arrangement while the lower temperature aluminum alloy and magnesium comprise about 8 and 2% by weight respectively.

The screen container 11 with the tube and mixture of aluminum spheres and magnesium are then subjected to a brazing process, preferably of the vacuum type as described in the paper by H. K. Herr, Vacuum Brazing of Aluminum, Society of Automotive Engineers, Automotive Engineering Congress, Jan. 10–14, 1972. The temperature is sufficient to cause a reaction between the magnesium and the oxide films which are present on the surfaces of spheres 20 thereby dissipating the films. Meanwhile the lower temperature aluminum alloy melts and is able to fuse to the surfaces of spheres 20 forming an unusually strong bond.

In its preferred form of use, the secondary fluid is directed parallel to the axis of rotation of the cylinder-shaped screen 11.

Figure 2:
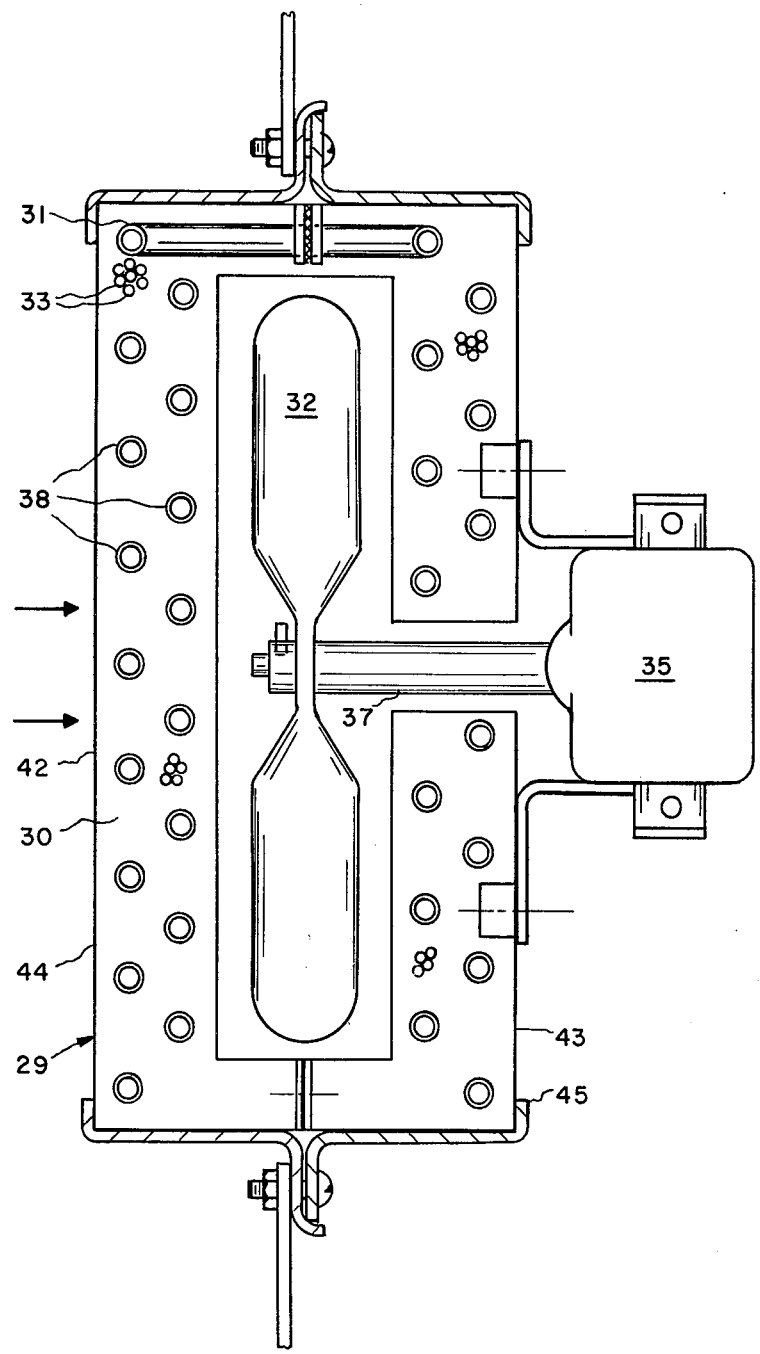
FIG. 2 is a frontal view in partial cross-section showing a heat exchanger core in accordance with the present invention which completely encloses a propeller or axial flow fan.

Referring to FIG. 2, shown there is an embodiment of the present invention wherein a substantial reduction of blower or fan noise is achieved. The heat exchanger 29 basically consists of the exchanger core 30 and axial fan 32 which is driven by motor 35. The exchanger 29 is constructed as a single assembly with the motor and fan appropriately bolted to the exchanger core. The exchanger core 30 is constructed of a single tubular element 31 which has tubular sub-elements 38 (shown in cross section) interconnected by appropriate bends, and by metallurgically connected balls or spheres 33. The tubular sub-elements may be interconnected by appropriate U-shaped bends as previously described with respect to FIG. 1 or the tubular element 31 may preferably be shaped as a continuous spiral. This is preferred to be more compatible with the generally cylindrical shape of the core.

The core 30 is seen in cross section in FIG. 2 to be essentially a closed solid having a cavity sufficiently large to accomodate the fan 32. The preferred shape of the exchanger is cylindrical with sides 44 and 45 forming the bases of the cylinder. The core 30 has a single opening to allow the shaft 37 of the motor to extend into the cavity to support the fan blades. The core 30 is preferably constructed of front cylindrical section 42 and rear cylindrical section 43. It is also possible to consider these sections as two separate exchanger cores having common primary fluid paths. The shaft opening may be drilled out of the rear section after its construction. The flow path for the primary fluid is interconnected by the use of appropriate fittings to be described further with respect to FIG. 3.

The two core sections 42 and 43 are constructed in much the same manner as had been described with respect to FIG. 1.

Figure 3:
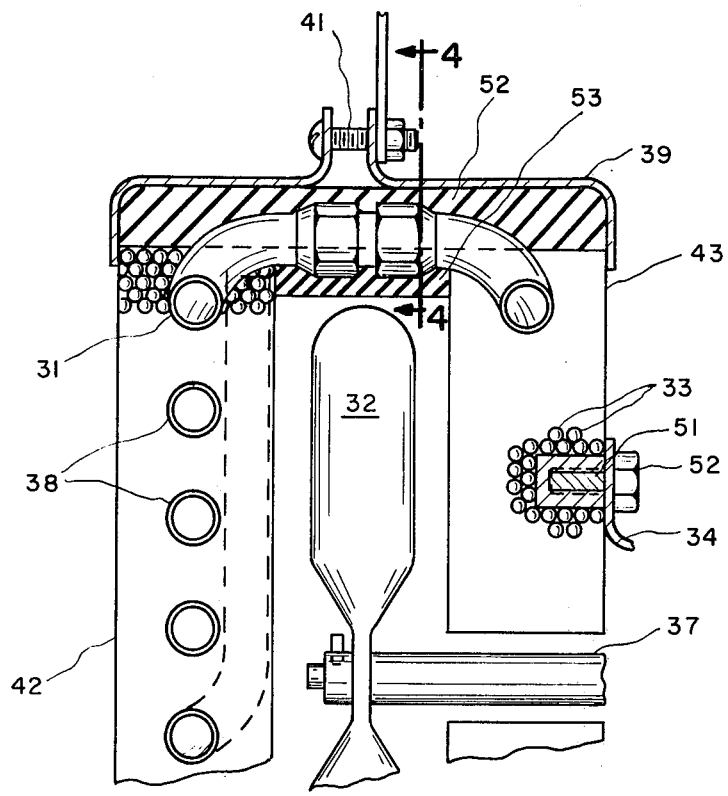
FIG. 3 is an exploded frontal view of a portion of the arrangement of FIG. 2.

The view of FIG. 3 shows an exploded view of the exchanger of FIG. 2, with like numbers corresponding to like parts. The primary fluid circuit through tube 31 is interconnected by appropriate swage-lock fittings 50. Primary fluid inlet and outlet ports are also provided which are not shown in the figure. The two core sections 42 and 43 are bridged on the sides of the cylinder by a closed-cell rubber foam 52. The basic spacing between the two core sections is provided by hard rubber portions 53 which preferably are bonded to the closed cell rubber foam 52. On the outer side of rubber foam 52 is a sheet metal enclosure 39 formed of two appropriately shaped sections which are clamped together by appropriate means such as bolts 41.

The motor and fan assembly is bolted to the brazed core assembly. This is done by appropriately drilling and tapping holes 51 in the brazed core assembly. The motor brackets 34 are clamped by a threaded element 52 screwed into hole 51.

Figure 4:
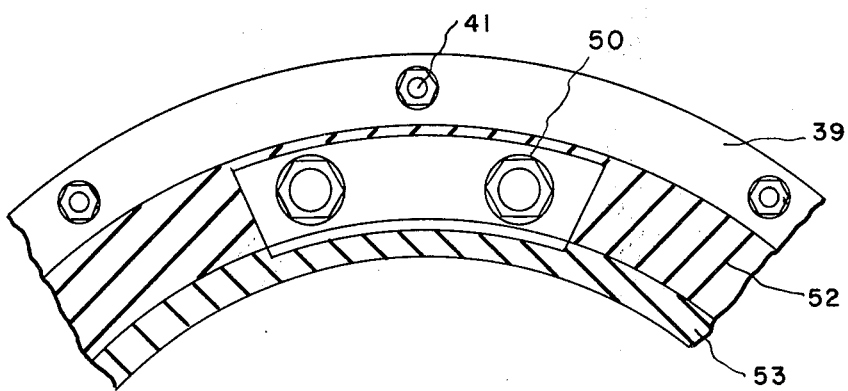
FIG. 4 is a partial sectional view taken along the line 4—4 of FIG. 3.

In the partial sectional view of FIG. 3, shown in FIG. 4, a better understanding of the construction of the heat exchanger may be had. There, the rubber foam 52 has the hard rubber 53 bonded to it on the inside of the cylinder with the metal bracket 39 on the outside. A cross section of the swage-lock fittings 50 may be seen as well. Finally, the cylindrical shape of the exchanger may be ascertained in this view.

In one example of a device constructed as described relative to FIGS. 2, 3 and 4, the diameter of the cylinder was 13 inches, the cylinder height was 3½ inches, tube diameter was ⅜ of an inch and the spheres were 0.125 inches in diameter. The height of each core section was 1⅛ inch and the space between the sections to accommodate the fan was 1¼ inch. A preferred motor for this particular example is a shaded pole, fractional horsepower motor such as model BA2 or BA3 type manufactured by Universal Electric Company.

Figure 5A:
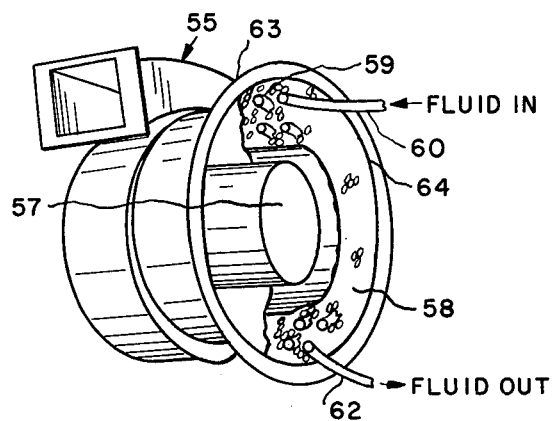
FIG. 5a is a perspective view of a heat exchanger in accordance with the present invention, with the core mounted as an annulus around the protruding housing of a centrifugal fan.
Figure 5B:
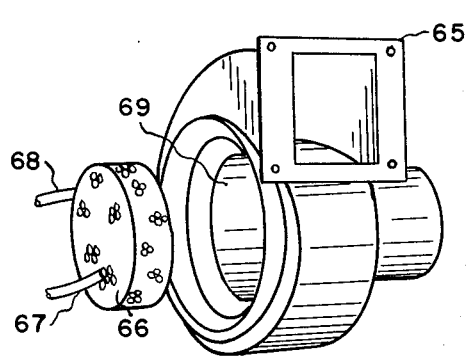
FIGS. 5b and 5c are perspective views of a heat exchanger system in accordance with the present invention in which the core is inserted into the air inlet opening of a centrifugal fan.
Figure 5C:
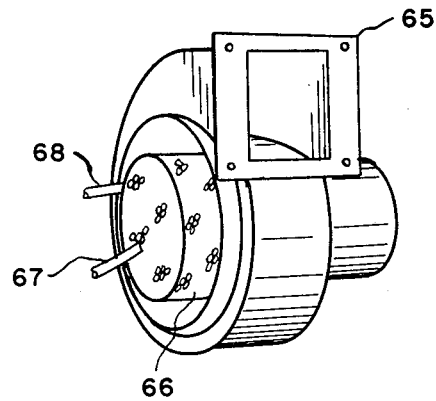

FIGS. 5a, 5b and 5c illustrate two similar embodiments of the present invention which utilize the ability of the invention to conform to available space to improve volume efficiency of the exchanger. FIG. 5a illustrates an "inverted" centrifugal blower 55 which has the drive motor (not shown) inside the squirrel cage wheel. A cup-shaped flange 63 surrounds the squirrel cage wheel and motor 57. The exchanger is created by inserting (and appropriately clamping) an annular shaped, spherical ball and tube heat exchanger core 58 in the annular space between motor and wheel housing 57 and the flange 63. The core has the usual tubular elements 59 and metallurgically connected balls 64. An appropriate inlet port 60 and outlet port 62 are provided.

The annular shaped exchanger core is constructed in the manner described previously with the exception that the screen container must also be appropriately annularly shaped.

In FIGS. 5b and 5c, which are shown in somewhat more schematic fashion, a more conventional centrifugal blower assembly 65 is shown having the usual squirrel cage which has a large opening for the intake of air or other fluid. The figures illustrate the insertion of an appropriate shaped shpere and tube assembly 66 into the inlet space 69. The assembly 66 has the usual inlet and outlet ports 67 and 68.

Figure 7A:
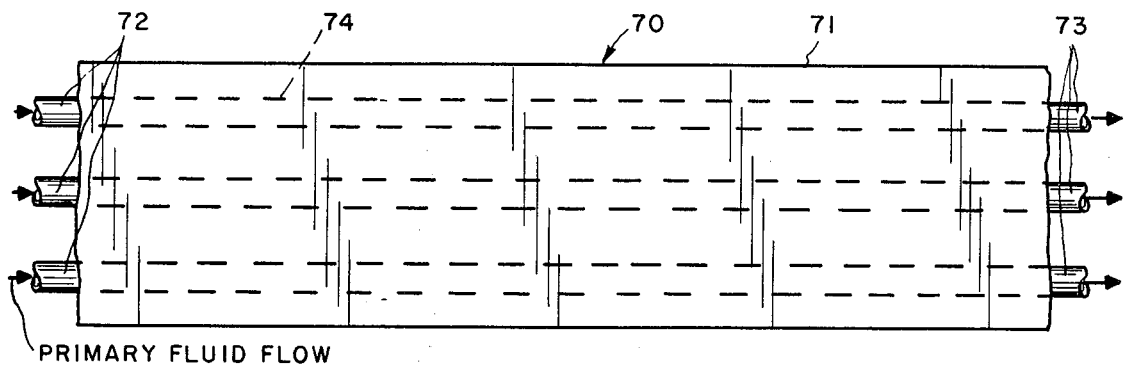
FIG. 7a is a top view and FIG. 7b is a frontal view of a set of primary fluid tubes having a predetermined wave pattern with the heat exchanger core conforming to the wave pattern.
Figure 7B:
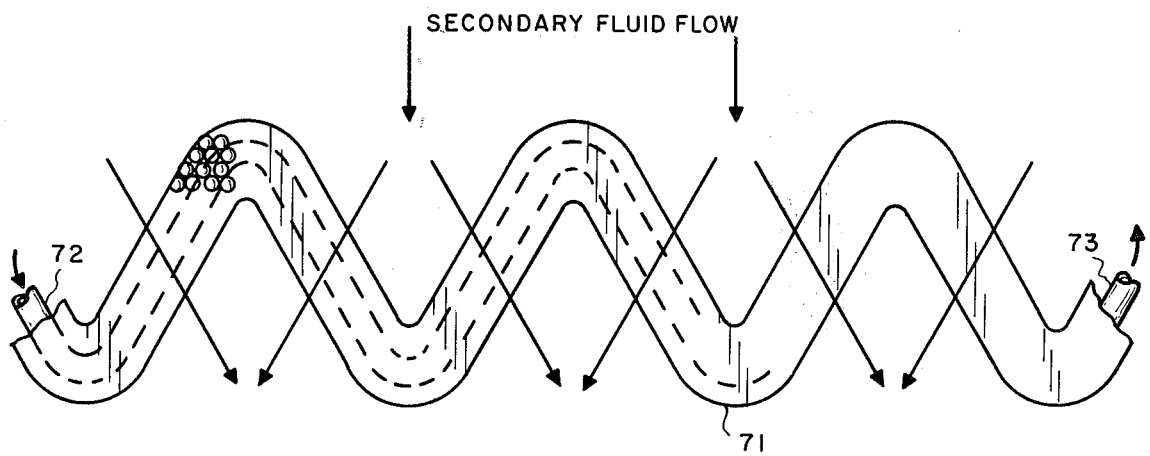

FIGS. 7a and 7b illustrate another embodiment of the present invention in which the unique ability of the core to conform to predetermined shapes is shown. A heat exchanger core 70 is constructed to have a "folded" or "wave-like" appearance. The core comprises the primary fluid tubes 74 having a plurality of input ports 72 and output ports 73. The primary fluid tubes 74 are seen to be parallel in this construction as shown in FIG. 7a. FIG. 7b shows the cross-sectional appearance of the core which is seen to be a saw-tooth or wave shape. The secondary fluid flow is in the direction of the transverse dimension to the core.

The spherical element brazed aluminum structure 71 surrounds the primary fluid tubes 74. The spherical element structure 71 extends across all of the tubes and is of a thickness to extend above and below the outer diameter of the primary tubes. In a parctical example, the tubes are typically ⅜ inch in diameter and the core thickness is 1 inch which is symmetrically disposed about the tubes.

The assembly is constructed as previously described except for the rectangular shape necessary for the screen container. In the present instance, the screen container is an elongated, flattish structure. The primary tubes are disposed in the screen container and the spherical balls are poured in, following which step the assembly is brazed. This results in an essentially flat structure with the spherical elements disposed about the tubes. Subsequently, the flat assembly is appropriately deformed to achieve the "folded" or "wave-like" nature shown in FIG. 7b.

This embodiment achieves in combination the advantages of the "folded" design with the many advantages of the spherical ball and tube design to provide an unusually efficient and compact heat exchange core.

While all of the previous embodiments considered the use of solid spherical aluminum balls, the present invention also contemplates the use of hollow aluminum balls to achieve substantial reduction in weight, where weight is an important consideration. Such hollow balls would preferably contain either a vacuum or low pressure inert gas filling.

While the invention described hereabove is based on actual observed advantages of a spherical ball and tube heat exchanger, the following theoretical analysis is presented as a basis for comparing a spherical ball and tube exchanger in accordance with the present invention with a standard fin and tube exchanger. Such comparison is based solely on an analytical approach and is not intended in any way as a limitation of the present invention.

The heat transfer in a fin and tube heat exchanger may be determined by the relationship between the Nussault number and the Reynolds and Prandtl number (1) $Nu = 0.025 Re^{0.8} Pr^{0.33}$ From "Engineering Heat Transfer" by Shao Ti Hsu, D. Van Nostrand Company, Inc., p. 298)

For the spherical ball and tube heat exchanger, the appropriate relationship is (2) $Nu = 0.23 Re^{0.7} Pr^{0.33}$ From "Compact Heat Exchangers" by Kays and Conlon, Second Ed., McGraw Hill, p. 131).

For a fin and tube heat exchanger having 10 fins per inch, a typical figure of merit, and a spherical ball heat exchanger having spheres approximately 0.125 inches in diameter, the following comparison results when an air velocity of 10 feet per second enters the respective heat exchangers.

The secondary surface area per cubic foot is

A spheres = 119 ft$^2$/ft$^3$

A fin/tube = 240 ft$^2$/ft$^3$

The area for the fin and tube thus is almost twice that of the spherical ball heat exchanger. However, from equation (1) it can be shown that for an air velocity of 10 ft/sec, the heat transfer coefficient, $h$, is 4.627 BTU/hr ft$^2$ F for the fin and tube exchanger and from equation (2) $h$ is 23.68 for the spherical ball and the exchanger or 5.12 times greater. Therefore, for the same volume, the spherical element exchanger results in a heat transfer which is 2.54 times greater.

A comparison of the weight of the two exchangers described above yields the comparative figure that the spherical ball exchanger weighs 3.96 times more. If the spherical ball exchanger were designed for the same heat transfer, the spherical ball system would weigh 1.559 times more than the fin and tube exchanger.

As previously stated, however, hollow aluminum spheres may be used. If hollow ⅛ inch diameter spheres having 0.016 inch wall thickness were used to construct a spherical ball heat exchanger, an exchanger having the same heat transfer as the fin and tube exchanger would weigh only 0.765 times as much.

While the foregoing specification and drawings represent the preferred embodiments of the present invention, it will be obvious to those skilled in the art that various changes and modifications may be made therein without departing from the true spirit and scope of the present invention.

I claim:

1. A method of constructing a liquid to gas heat exchanger core comprising the steps of:
    placing a metallic tubular element into an open ended container and holding said tubular element and container fixed relative to each other;
    substantially filling said container with rounded metallic elements of a first predetermined size and a first predetermined melting point and particles of a similar metallic material having a second predetermined size smaller than said first predetermined size and a second predetermined melting point lower than said first predetermined melting point, to a level wherein said metallic tubular element is completely surrounded by and is contiguous with said rounded elements and particles, said smaller particles being discrete and loosely introduced into the container;
    heating said container and its contents to a temperature between said first and second melting points to melt said particles and fuse said rounded elements to each other and to said metallic tubular element.

2. The method of claim 1 wherein said tubular element, rounded elements and particles are of an alloy of aluminum.

3. The method of claim 2 wherein said heating step is a vacuum brazing technique.

4. The method of claim 3 wherein said heating step is a salt brazing technique.

5. The method of claim 2 wherein said rounded elements are spheres of aluminum alloy having a melting point of approximately 1200°F and the particles have a melting point of approximately 1120°F.

6. The method of claim 2 wherein the total weight of said smaller particles and larger rounded elements comprises about 5–10% by weight of the smaller particles and 90–95% by weight of the larger rounded elements.

7. The method of claim 1 further comprising the step of prior to heating, placing a small quantity of a third material into said container which reacts with oxide films present on the surfaces of said rounded metallic elements during heating.

8. The method of claim 7 wherein said tubular element, rounded elements and particles are an aluminum alloy and said third material is magnesium.

9. The method of claim 8 wherein the total weight of said smaller particles, larger rounded elements and magnesium comprises about 90% by weight of higher melting temperature aluminum alloy, about 8% by weight of lower temperature aluminum alloy and 2% by weight of magnesium.

* * * * *